(12) United States Patent
Takenaka

(10) Patent No.: US 10,262,247 B2
(45) Date of Patent: Apr. 16, 2019

(54) IMAGE FORMING APPARATUS FOR CONVERTING PRINT DATA INTO INTERMEDIATE DATA, METHOD FOR CONTROLLING IMAGE FORMING APPARATUS, AND STORAGE MEDIUM

(71) Applicant: CANON KABUSHIKI KAISHA, Tokyo (JP)

(72) Inventor: Shuichi Takenaka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/189,935

(22) Filed: Jun. 22, 2016

(65) Prior Publication Data
US 2016/0379098 A1 Dec. 29, 2016

(30) Foreign Application Priority Data

Jun. 29, 2015 (JP) ................................. 2015-129996

(51) Int. Cl.
*G06K 15/02* (2006.01)
*G06K 15/00* (2006.01)
*H04N 1/21* (2006.01)

(52) U.S. Cl.
CPC ..... *G06K 15/1849* (2013.01); *G06K 15/1806* (2013.01); *G06K 15/1836* (2013.01); *G06K 15/1857* (2013.01); *G06K 15/1889* (2013.01); *G06K 15/408* (2013.01); *H04N 1/2104* (2013.01); *G06K 2215/0042* (2013.01); *G06K 2215/0085* (2013.01); *H04N 2201/0094* (2013.01); *H04N 2201/21* (2013.01); *H04N 2201/3232* (2013.01); *H04N 2201/3284* (2013.01)

(58) Field of Classification Search
None
See application file for complete search history.

(56) References Cited

U.S. PATENT DOCUMENTS

2014/0092410 A1* 4/2014 Taima ................... G06F 3/1234
358/1.13
2015/0092218 A1* 4/2015 Wakamatsu ............ G06F 3/121
358/1.14

FOREIGN PATENT DOCUMENTS

JP 2013-14039 A 1/2013

* cited by examiner

*Primary Examiner* — Lennin R Rodriguezgonzalez
(74) *Attorney, Agent, or Firm* — Canon U.S.A., Inc. I.P. Division

(57) ABSTRACT

There is provided an image forming apparatus configured to process print data of a plurality of pages includes a plurality of interpreters configured to generate intermediate data of the plurality of pages by interpreting the print data, a control unit configured to specify different pages for different interpreters, and, for each specified page, cause a corresponding interpreter to generate the intermediate data of the specified page or specified pages, and a generation unit configured to generate a raster image of the page based on the generated intermediate data, wherein, based on interpretation of the print data of an invalid page, any one interpreter of the plurality of interpreters generates the intermediate data of a page subsequent to the invalid page without requiring the page to be specified by the control unit.

13 Claims, 13 Drawing Sheets

```
%!PS-Adobe-3.0
newpath
100 100 moveto                              ⎫
500 700 lineto                              ⎬ Page 1
stroke                                      ⎪
showpage                                    ⎭

0 0 0 setrgbcolor                           ⎫
/Times-Roman findfont 64 scalefont setfont  ⎪
100 600 moveto                              ⎬ Page 2
(I am a string.) show                       ⎪
showpage                                    ⎭

300 400 translate                           ⎫
144 144 scale                               ⎬ Page 3
8 8 1 [8 0 0 8 0 0] {<c936>} image          ⎪
erasepage                                   ⎭

0 0 0 setrgbcolor                           ⎫
/Times-Roman findfont 64 scalefont setfont  ⎪
100 600 moveto                              ⎬ Page 4
(I am a string.) show                       ⎪
showpage                                    ⎭
```

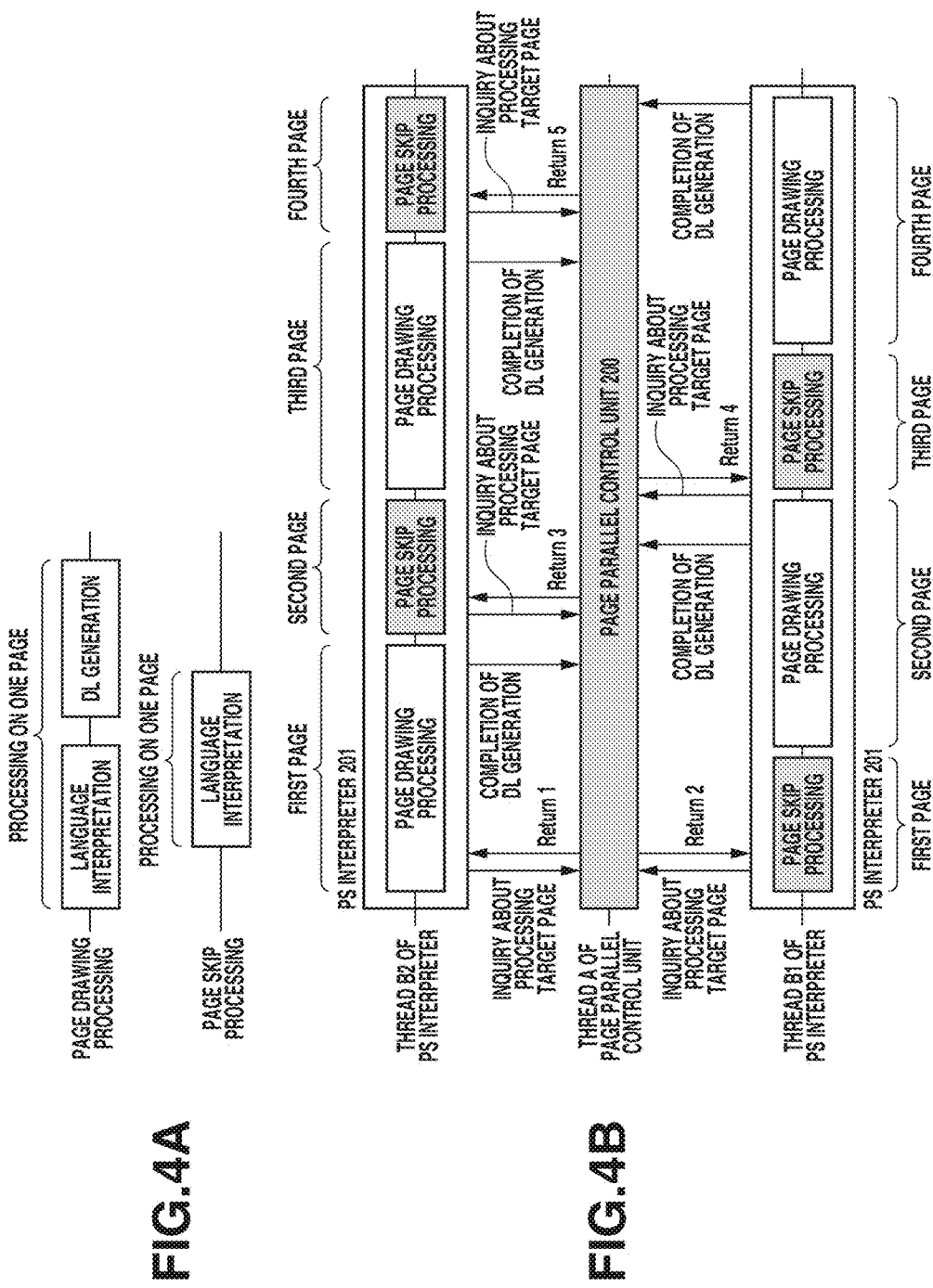

FIG.9A

| PageID | Status | Output | OutputPage |
|---|---|---|---|
| 1 | Complete | True | 1 |
| 2 | Running | — | — |
| 3 | Complete | True | — |
| 4 | Complete | False | — |
| 5 | Complete | True | — |
| 6 | Running | — | — |
| 7 | — | — | — |
| 8 | — | — | — |

FIG.9B

| PageID | Status | Output | OutputPage |
|---|---|---|---|
| 1 | Complete | True | 1 |
| 2 | Complete | False | none |
| 3 | Complete | True | 2 |
| 4 | Complete | False | none |
| 5 | Complete | True | 3 |
| 6 | Running | — | — |
| 7 | — | — | — |
| 8 | — | — | — |

FIG.9C

| PageID | Status | Output | OutputPage |
|---|---|---|---|
| 1 | Complete | True | 1 |
| 2 | Complete | False | none |
| 3 | Complete | True | 2 |
| 4 | Complete | False | none |
| 5 | Complete | True | 3 |
| 6 | Running | — | — |
| 7 | Complete | True | — |
| 8 | Complete | True | — |

FIG.9D

| PageID | Status | Output | OutputPage |
|---|---|---|---|
| 1 | Complete | True | 1 |
| 2 | Complete | False | none |
| 3 | Complete | True | 2 |
| 4 | Complete | False | none |
| 5 | Complete | True | 3 |
| 6 | Complete | False | none |
| 7 | Complete | True | 4 |
| 8 | Complete | True | 5 |

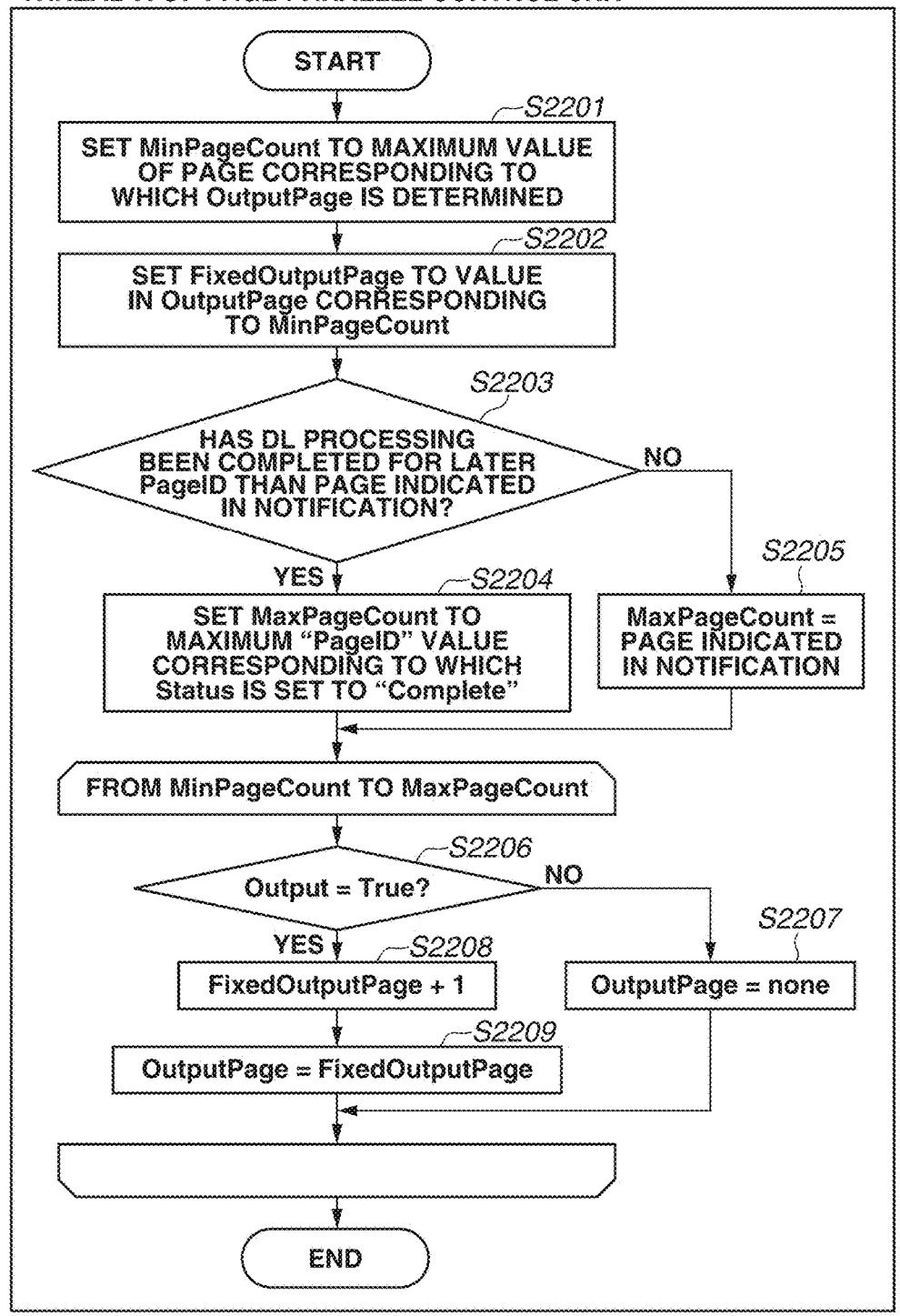

IMAGE FORMING APPARATUS FOR CONVERTING PRINT DATA INTO INTERMEDIATE DATA, METHOD FOR CONTROLLING IMAGE FORMING APPARATUS, AND STORAGE MEDIUM

BACKGROUND OF THE INVENTION

Field of the Invention

The present disclosure relates to an image forming apparatus, a method for controlling an image forming apparatus, and a storage medium.

Description of the Related Art

In recent years, the improvement of the hardware technology has allowed development and an increasingly widespread use of a multi-core central processing unit (CPU) enabling a plurality of calculation processes to be performed in parallel with each other or one another concurrently. Multifunctional peripherals having a plurality of functions, such as copying and faxing, have also been starting to be provided with the multi-core CPU. For the multifunctional peripheral provided with the multi-core CPU, there has been being developed a technique for realizing parallel execution by controlling print processing in a multi-threading manner. The print processing includes high-load image processing that converts received print data into a raster image, and there has been being proposed a technique for realizing a speedup of the print processing by processing this image processing in the multi-threading manner.

The image processing is realized by language interpretation processing for interpreting a content of the print data, display list (DL) generation processing for converting the print data into intermediate data called a display list (hereinafter referred to as a DL), and rendering processing for converting the generated DL into the raster image. There is a technique for processing these processing procedures in the multi-threading manner. Japanese Patent Application Laid-Open No. 2013-14039 discusses a page parallel technique for performing the language interpretation processing, the DL generation processing, and the rendering processing while dividing the processing on the print data page by page and assigning a divided piece of the processing to each thread.

PostScript (registered trademark) (hereinafter referred to as PS) may be employed as a page description language (PDL) of the print data, and operators of PS include an operator (a drawing command) that invalidates a content of a page to be drawn, thereby prohibiting this page from being output, such as "erasepage". Inclusion of such an operator invalidating the page drawing raises the necessity of performing page re-sorting processing for making pages consistent to correctly control a page or pages after that.

For example, if the "erasepage" operator is contained in the PS data of a second page, a third page and a fourth page should be processed as a result of outputting a second sheet and a result of outputting a third sheet, respectively. In the page parallel technique discussed in Japanese Patent Application Laid-Open No. 2013-14039, a job control unit, which assigns a page to be processed as a processing target to each thread, is unequipped with measures for detecting the operator that invalidates the drawing of the page. Therefore, the execution of the page re-sorting processing is impossible, which results in occurrence of a failure such as being unable to assign the result of drawing the third page to the result of outputting the second sheet, thereby printing the second sheet in blank or printing the results of outputting the second sheet and a sheet or sheets after that with layouts thereof out of position.

SUMMARY OF THE INVENTION

The present disclosure is directed to an image forming apparatus capable of performing drawing processing in conformity with normal page number information even if detecting the invalid page when generating the intermediate data from the print data.

According to an aspect of the present disclosure, an image forming apparatus configured to process print data of a plurality of pages includes a plurality of interpreters configured to generate intermediate data of the plurality of pages by interpreting the print data, a control unit configured to specify different pages for different interpreters, and, for each specified page, cause a corresponding interpreter to generate the intermediate data of the specified page or specified pages, and a generation unit configured to generate a raster image of the page based on the generated intermediate data, wherein, based on interpretation of the print data of an invalid page, any one interpreter of the plurality of interpreters generates the intermediate data of a page subsequent to the invalid page without requiring the page to be specified by the control unit.

According to other aspects of the present disclosure, one or more additional image forming apparatuses, one or more methods for use with same and one or more storage mediums are discussed herein. Further features of the present disclosure will become apparent from the following description of exemplary embodiments with reference to the attached drawings.

BRIEF DESCRIPTION OF THE DRAWINGS

FIGS. 4A, 4B, and 4C are brief sequence diagrams illustrating page parallel processing performed on normal data.

FIGS. 9A, 9B, 9C, and 9D are tables each illustrating one example of a database managed in common.

FIG. 12 is a flowchart illustrating the method for controlling the image forming apparatus.

DESCRIPTION OF THE EMBODIMENTS

Exemplary embodiments will be described below with reference to the drawings.

<Description of System Configuration>
<Hardware Block Diagram of Image Forming Apparatus>

Figure 1:
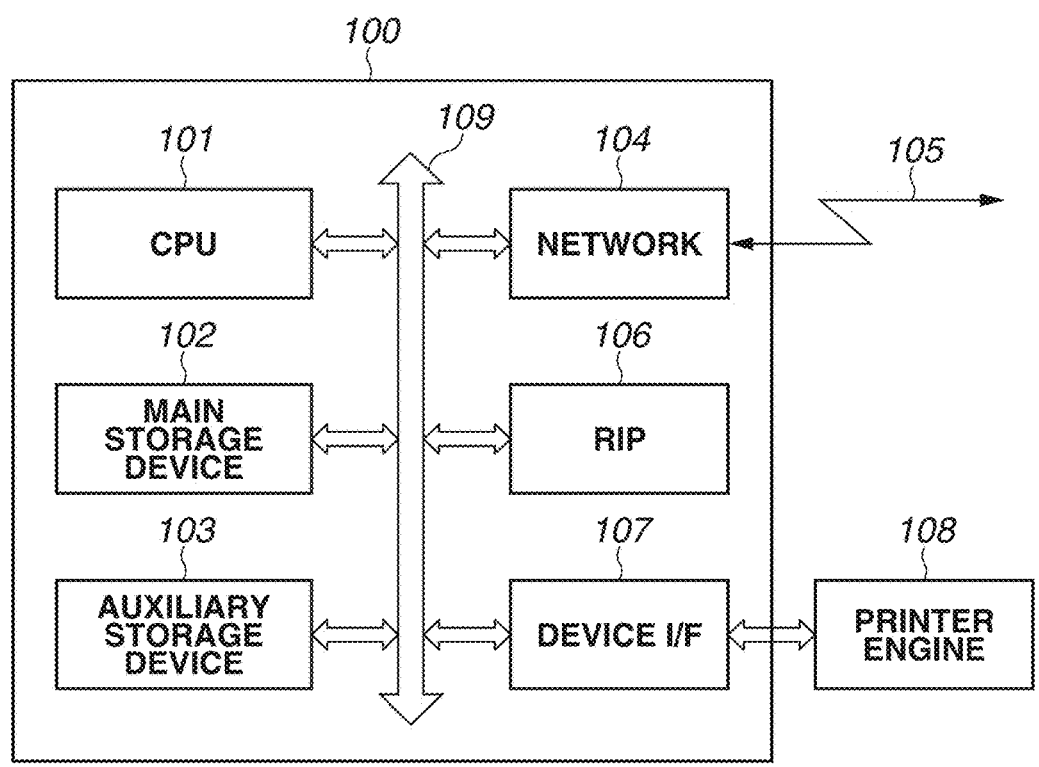
FIG. 1 is a hardware block diagram illustrating a configuration of an image forming apparatus.

FIG. 1 is a block diagram illustrating a hardware configuration of an image forming apparatus according to a first exemplary embodiment. The image forming apparatus that will be described in the present exemplary embodiment includes the following configurations to process input print data based on a predetermined page description language (PDL data).

In FIG. 1, a control unit 100 controls inputs and outputs of an image signal and device information. A central processing unit (CPU) 101 reads out a program stored in an auxiliary storage device 103 into a main storage device 102, and executes the read program. Further, the CPU 101 integrally controls each device connected to a system bus 109. The CPU 101 employs a multi-core system including a plurality of processors as hardware to realize parallel processing. Alternatively, the CPU 101 may employ a system including a plurality of processor cores as microprocessors. Alternatively, the CPU 101 may employ a system capable of using a technique that allows a single processor to appear as if a plurality of processors is in operation by making effective use of an unoccupied time of a register and a pipeline in the processor, such as hyper-threading. The main storage device 102 functions as a main memory and a work memory of the CPU 101.

The auxiliary storage device 103 is also used for a purpose of holding large-volume data temporarily or for a long term. In the present exemplary embodiment, data is stored into a buffer area when pipeline parallelism is performed, and the main storage device 102 or the auxiliary storage device 103 serves as a destination of this storage. A Network 104 is connected to a network 105, and is in charge of inputs and outputs of the print data and the device information between the image forming apparatus and the outside thereof.

A raster image processor (RIP) 106 rasterizes a DL, which is intermediate data, into a raster image. Further, the RIP 106 processes the DL generated in the main storage device 102 or the auxiliary storage device 103 by the CPU 101 quickly and in parallel with the execution of the CPU 101.

A device interface (I/F) 107 transmits the image signal, instructs a device to operate, and receive the device information based on an instruction from the CPU 101. The controller unit 100 is connected to a printer engine 108 via the device I/F 107. The printer engine 108 is an output device that outputs the image signal transferred from the control unit 100 onto a medium, and may be any of the electrophotographic method and the inkjet method.

<Diagram Illustrating Software Modules of Image Forming Apparatus>

Figure 2:
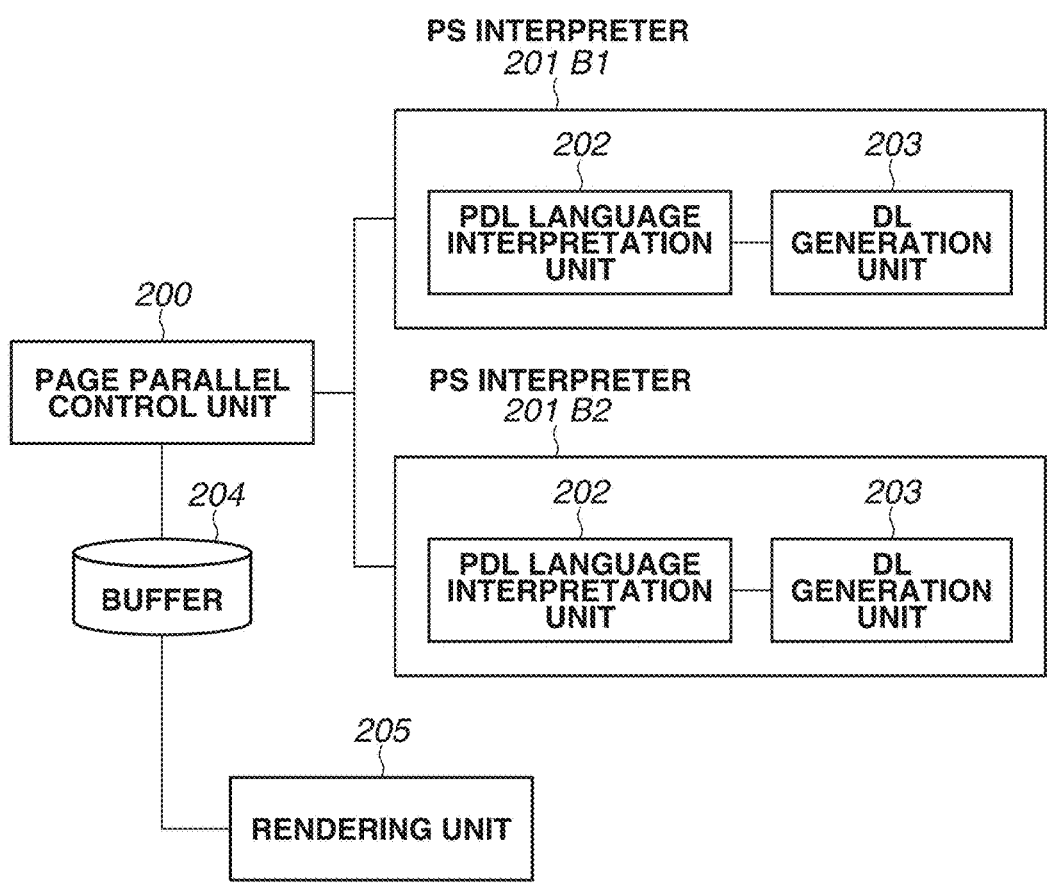
FIG. 2 illustrates a configuration of software modules of the image forming apparatus.

FIG. 2 illustrates a configuration of software modules of the image forming apparatus according to the present exemplary embodiment. Each of the software modules illustrated in FIG. 2 is stored in the auxiliary storage device 103 as a program, and is loaded into the main storage device 102 and executed by the CPU 101.

A page parallel control unit 200 launches PS interpreters 201 corresponding to a plurality of threads, and performs thread control. The page parallel control unit 200 also plays a role of dividing the print data page by page and assigning a page to be processed as a processing target to each of the threads so as to handle the print processing as the parallel processing. In the present exemplary embodiment, the page parallel control unit 200 is configured assuming that the page parallel control unit 200 launches two threads, whereby there are two PS interpreters 201, but the page parallel control unit 200 may be configured to launch as many threads as the processor cores of the CPU 101 can control in parallel, and assign the PS interpreters 201 thereto. The page parallel control unit 200 causes the PS interpreters 201 to perform the parallel processing by specifying page number information indicating a number of the page that should be processed for each of the PS interpreters 201 according to a page request and a notification indicating completion of the intermediate data from each of the PS interpreters 201.

Each of the PS interpreters 201 includes a PDL language interpretation unit 202 and a DL generation unit 203, and interprets the print data and generates the DL as the intermediate data. The PDL language interpretation unit 202 interprets a data content written in the page description language in the print data. The DL generation unit 203 generates the DL as the intermediate data from a result of the interpretation carried out by the PDL language interpretation unit 202.

A buffer 204 buffers the DL generated from each of the plurality of PS interpreters 201. When the page parallel technique is employed, the threads may complete their respective processing procedures in an order that does not necessarily match an order of pages, and processing on a later page than some page may be completed first therebetween.

However, the print data should be output in the order of pages, whereby this buffer 204 is used as a buffer area until an unprocessed page is completed. The buffer 204 secures and uses a part of the main storage device 102 as the buffer area, but may be configured to use a part of the auxiliary storage device 103 instead of the main storage device 102 if the main storage device 102 cannot provide an area large enough to buffer the DL. A rendering unit 205 corresponds to the RIP 106 illustrated in FIG. 1, and rasterizes the DL to generate the raster image. In other words, the rendering unit 205 generates image data of respective pages that should be output from the pieces of intermediate data generated by the plurality of PS interpreters 201.

<Example of Writing of Print Data and Drawn Contents>

Figures 3A, 3B:
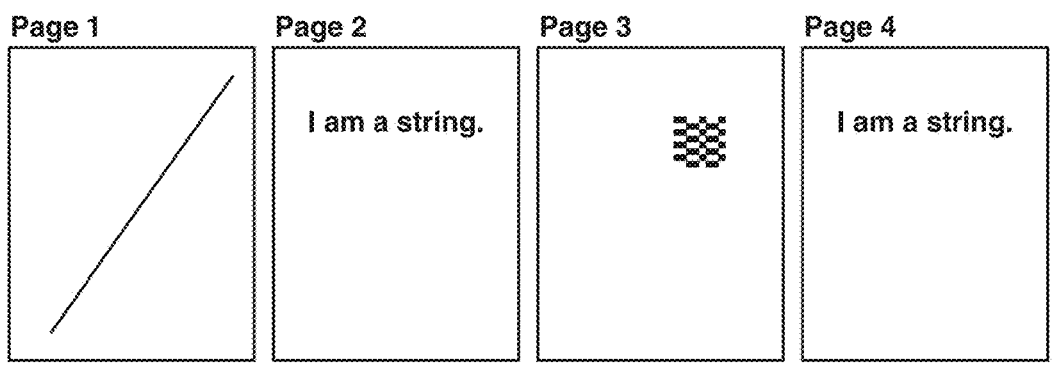
FIGS. 3A and 3B illustrate examples of writings of drawing objects and contents drawn according thereto, respectively.

FIGS. 3A and 3B illustrate examples of writings of drawing objects written in the print data, and contents drawn according thereto, respectively.

FIG. 3A illustrates one example of a writing of the print data using PostScript (registered trademark), which is the page description language.

An oblique line segment is defined in a portion of Page 1. A character string "I am a string." is defined in Page 2. A checkered pattern object is defined in Page 3. A character string "I am a string." is also defined in Page 4, similarly to Page 2. A "showpage" operator is used at a page break in PostScript (registered trademark). Besides that, the "erasepage" operator, which invalidates the content to be drawn, may be used. In the example illustrated in FIG. 3A, the "erasepage" operator is used in Page 3.

FIG. 3B illustrates the contents drawn according to the drawing objects written in FIG. 3A. Contents corresponding to four pages are drawn as the contents of the data, but Page 3 is not output since the "erasepage" operator is used in Page 3.

<Sequence of Page Parallel Processing>

The present exemplary embodiment is directed to the page parallel processing when PostScript (registered trademark) is employed as the page description language of the print data. PostScript (registered trademark) can write information for the print processing at any portion in the print data even across pages. Therefore, when the page parallel technique is employed for the print processing based on PostScript (registered trademark), each of the threads that perform the multi-thread processing should carry out the language interpretation on the data from a beginning of the data. Now, processing for generating the intermediate data that includes the page request and the notification indicating the completion of the intermediate data from each of the interpreters 201 will be described with reference to FIG. 4.

Therefore, in the present exemplary embodiment, each of the PS interpreters 201 proceeds with the processing in any of two operation modes as illustrated in FIG. 4A. A first one of them is page skip processing, and the PS interpreter 201 performs only the language interpretation processing using the PDL language interpretation unit 202 at this time. Another one is page drawing processing, and the PS interpreter 201 performs both the language interpretation processing using the PDL language interpretation unit 202 and the DL generation processing using the DL generation unit 203 at this time.

The page skip processing can speed up the processing due to the omission of the DL generation processing, whereby the PS interpreter 201 proceeds with the processing by the page skip processing as far as a page immediately before the page specified as the drawing target, and processes the drawing target page by the page drawing processing. Both the page skip processing and the page drawing processing include the language interpretation processing, whereby the language interpretation processing is always performed from the beginning of the data to the processing target page, which can prevent a lack of information required for this processing target page, thereby allowing the print processing to be normally performed.

FIG. 4B illustrates an example of a brief sequence of the page parallel processing performed on normal data according to the present exemplary embodiment. A thread B1 and a thread B2 are launched and the PS interpreter 201 is assigned to each of the threads B1 and B2 by the page parallel control unit 200. Upon starting the processing, the PS interpreter 201 inquires about a page number specified as the processing target to the page parallel control unit 200. The page parallel control unit 200 notifies each of the threads B1 and B2 of the page number of the assigned processing target in consideration of parallelism of each of the threads B1 and B2.

In the example illustrated in FIG. 4B, the page parallel control unit 200 instructs the thread B1 and the thread B2 to first process a second page and a first page, respectively. Upon being notified of the processing target page from the page parallel control unit 200 (Return 1 and Return 2), each of the PS interpreters 201 performs the page skip processing as far as the processing target page, and the page drawing processing on the processing target page. The thread B2 performs the page drawing processing from the start since the first page is specified as the processing target page. The thread B1 performs the page skip processing on the first page and the page drawing processing on the second page since the second page is specified as the processing target page. Upon an end of the page drawing processing on the first page, the thread B2 notifies the page parallel control unit 200 of the completion of the DL generation, and then inquires about a page number specified as a next processing target to the page parallel control unit 200 after that.

The page parallel control unit 200 notifies the thread B2 of a third page as the next processing target page (Return 3) because having not yet being able to instruct either the thread B1 or B2 to process the third page at this timing in the example illustrated in FIG. 4B. After that, the PS interpreter 201 repeats the inquiry about the processing target page to the page parallel control unit 200, the page skip processing, the page drawing processing, and the notification indicating the DL generation until reaching a last page on each of the threads B1 and B2 in a similar manner. By this sequence, the page parallel processing is realized.

Figure 4C:
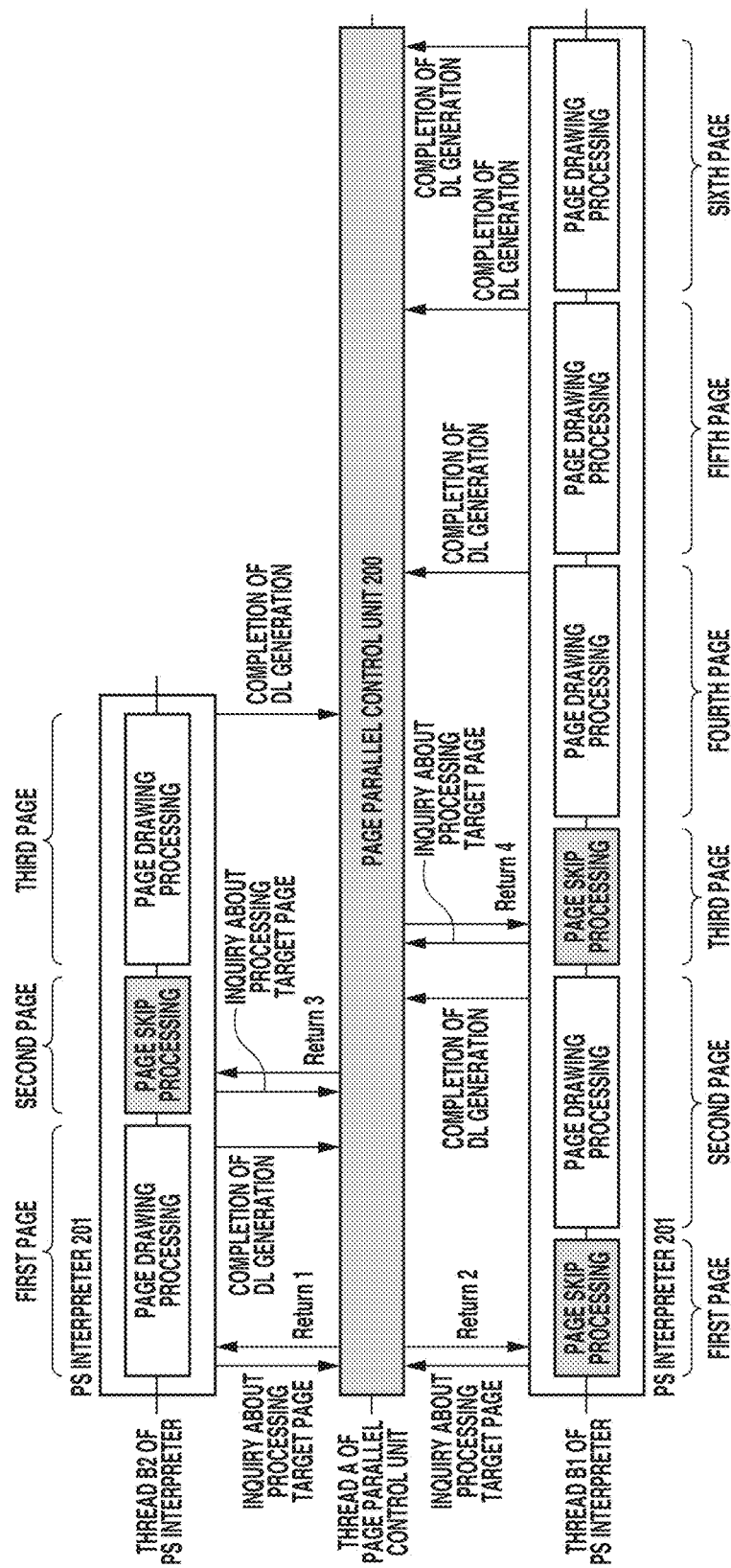

FIG. 4C is a brief sequence diagram illustrating the page parallel processing in a case where "erasepage" is contained in the third page according to the present exemplary embodiment. The thread B1 and the thread B2 are launched and the PS interpreter 201 is assigned to each of the threads B1 and B2 by the page parallel control unit 200.

However, since there is "erasepage" in the third page, the page parallel processing is stopped for the page processing on a fourth page and pages after that, and the processing is handed over to any one of the threads 1 and 2 while the processing at the other of the threads B1 and B2 is stopped. This is because the page parallel control unit 200 is not provided with the measures for detecting the invalid page, so that inconsistency occurs in a counter value for the page control, making it impossible to continue the processing correctly.

On the other hand, the PS interpreters 201 are each configured to include the measures for detecting the invalid page, so that a shift to a single-thread operation upon the detection enables the PS interpreter 201 to internally control the page counter value for the page control, thereby resolving the inconsistency in the page counter value.

Therefore, in the example illustrated in FIG. 4C, the thread B1, which has performed the page skip processing for the processing on the third page, takes over the page processing after that, while the thread B2, which has performed the page drawing processing for the processing on the third page, is controlled to stop the processing. At this time, the thread B1 operates as a single thread during the processing on the subsequent fourth page and pages after that, and therefore autonomously performs the page control while only transmitting the notification indicating the completion of the DL generation without inquiring about the page number specified as the processing target to the page parallel control unit 200 for the processing after that.

Further, because the thread B1 can detect the "erasepage" operator by the language interpretation processing in the page skip processing performed on the third page, the thread B1 can shift to the single-thread processing immediately regardless of a state of the processing performed by the thread B2. Upon detecting the "erasepage" operator during the page skip processing, the thread B1 autonomously takes over the processing on the fourth page and the pages after that and proceeds with the processing without waiting for a stop of the processing performed by the thread B2.

Even after the shift to this single-thread processing, when "erasepage" is detected, the page output should be controlled so as to prohibit this page from being output. In this case, the PS interpreter 201 internally counts the number of page(s) containing "erasepage" detected during the single-thread processing, which allows the execution of the page re-sorting processing for making the pages consistent. Details thereof will be described in detail in a description of FIG. 7.

<Page Control Performed by Page Control Unit>

Figure 5:
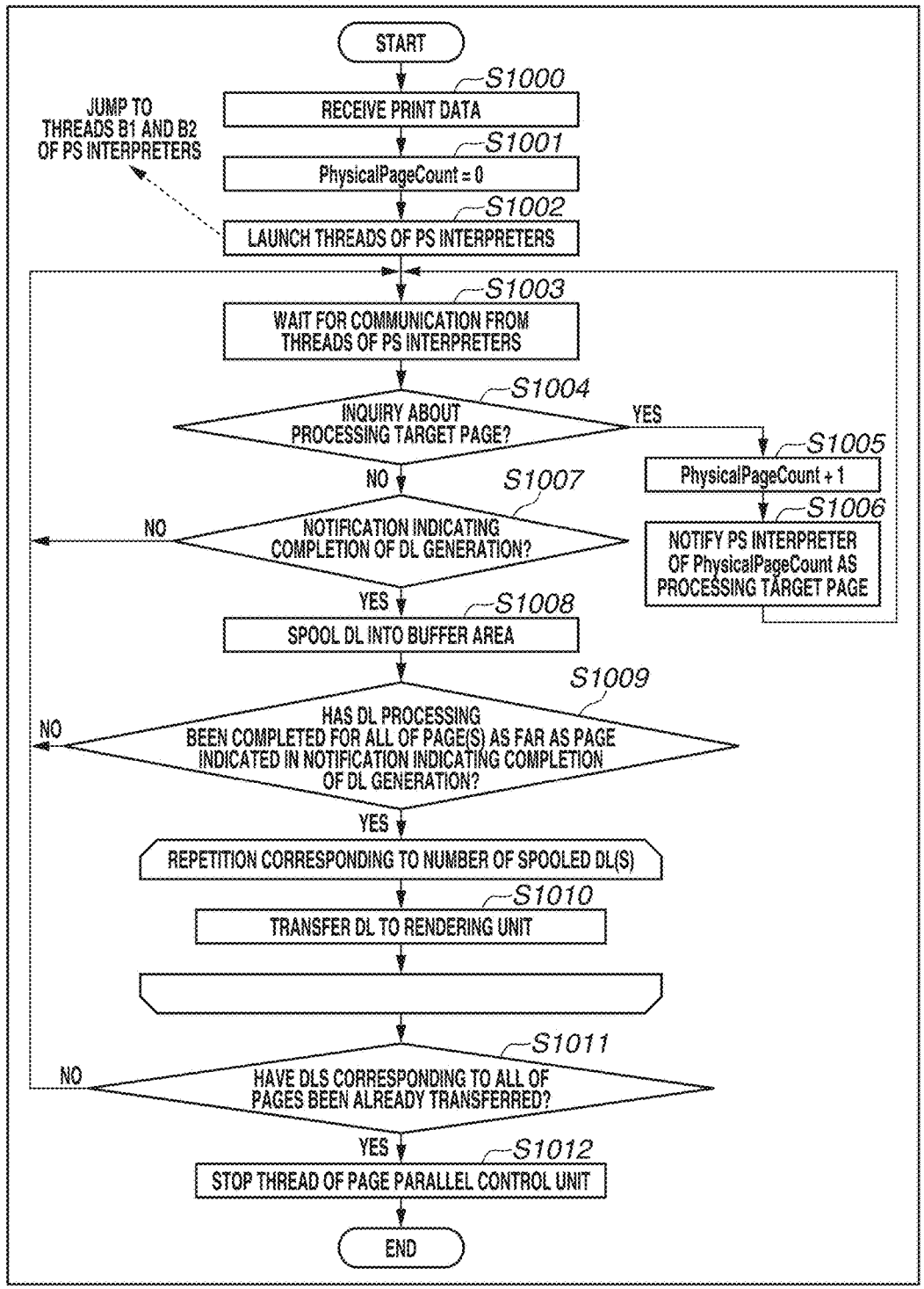
FIG. 5 is a flowchart illustrating a method for controlling the image forming apparatus.

FIG. 5 is a flowchart illustrating a method for controlling the image forming apparatus indicating the present exemplary embodiment. The present example is an example of the page control of the page parallel processing performed by the page parallel control unit 200 illustrated in FIG. 2. The CPU 101 executes the stored control program, by which each step is realized.

Now, a configuration required to perform the present control will be described. The page parallel control unit 200 illustrated in FIG. 2 has "PhysicalPageCount" as an internal page counter value for the page control. This counter value, "PhysicalPageCount" indicates a physical page number used for controlling on what number sheet (physical page) a result of drawing the page is to be laid out in an output product for each page.

For example, if the data contains "erasepage" in the third page, a first logical page and a second logical page are assigned to a first sheet corresponding to a first physical page and a second sheet corresponding to a second physical page, respectively.

However, the page output should be controlled in such a manner that a fourth logical page is assigned to a third sheet corresponding to a third physical page.

To that end, it is necessary to proceed with the page control with the counter values of the physical page ("PhysicalPageCount") and the logical page clearly distinguished from each other. In the present exemplary embodiment, "LogicalPageCount", which indicates the logical page, is managed by the PS interpreter 201. Details thereof will be described below referring to FIG. 6. Upon reception of the print data via the Network 104, the present processing is started by the CPU 101.

First, in step S1000, the CPU 101 receives the print data from a host (not illustrated) via the Network 104. Next, in step S1001, the CPU 101 sets "0" into "PhysicalPageCount" as initialization processing. Next, in step S1002, the CPU 101 launches the threads B1 and B2 illustrated in FIG. 6, which will be described below, and assigns the PS interpreters 201 to them, respectively.

Next, in step S1003, the CPU 101 waits for communication from the PS interpreters 201 launched in step S1002. At this time, the CPU 101 waits for communication that is either the inquiry about the page with respect to the processing target or the notification indicating the completion of the DL generation from the PS interpreters 201. Upon reception of the communication that is any one of them from the thread B1 or B2 of the PS interpreter 201, the processing proceeds to step S1004.

Next, in step S1004, the CPU 101 determines whether the communication received from the PS interpreter 201 in step S1003 is the inquiry about the processing target page. If the CPU 101 determines that the received communication is the inquiry about the processing target page at this time (YES in step S1004), the processing proceeds to step S1005. On the other hand, if the CPU 101 determines that the received communication is not the inquiry about the processing target page, i.e., the received communication is the notification indicating the completion of the DL generation (NO in step S1004), the processing proceeds to step S1007.

Next, in step S1005, the CPU 101 adds "1" to the "PhysicalPageCount" value, thereby incrementing the physical page number to be specified as the next processing target page.

Next, in step S1006, the CPU 101 notifies the PS interpreter 201 of the value of "PhysicalPageCount", which is the internal page counter value and indicates the physical page number, as the processing target page. After that, the processing returns to step S1003.

On the other hand, in step S1007, the CPU 101 determines whether the communication received from the PS interpreter 201 in step S1003 is the notification indicating the completion of the DL generation. If the CPU 101 determines that the received communication is the notification indicating the completion of the DL generation (YES in step S1007), the processing proceeds to step S1008. On the other hand, if the CPU 101 determines that the received communication is not the notification indicating the completion of the DL generation (NO in step S1007), the processing returns to step S1003 and is repeated.

Next, in step S1008, the CPU 101 spools the generated DL into the buffer area of the buffer 204. Next, in step S1009, the CPU 101 determines whether the DL generation has been completed for all of the page(s) as far as the page number indicated in the notification indicating the completion of the DL generation that has been received from the PS interpreter 201 in step S1003. If the CPU 101 determines that the DL generation has been completed for all of the page(s) at this time (YES in step S1009), the processing proceeds to step S1010.

On the other hand, if the CPU 101 determines that the DL generation has not been completed for all of the page(s) (NO in step S1009), the processing returns to step S1003 and is repeated. Next, in step S1010, the CPU 101 transfers all of the DL(s) spooled in the buffer 204 to the rendering unit 205 according to the order of page(s).

Next, in step S1011, the CPU 101 determines whether the DLs corresponding to all of the pages contained in the print data have been transferred. The CPU 101 can make this determination based on whether the threads B1 and B2 launched in step S1002 are stopped. If the CPU 101 determines that the DLs corresponding to all of the pages contained in the print data have been transferred at this time (YES in step S1011), the processing proceeds to step S1012.

On the other hand, if the CPU 101 determines that the DLs corresponding to all of the pages contained in the print data have not been transferred (NO in step S1011), the processing returns to step S1003 and is repeated.

Next, in step S1012, the CPU 101 stops its own thread A. Then, the present processing is ended. With this processing, the page control of the page parallel processing by the page parallel control unit 200 is performed.

<Parallel DL Generation Control Performed by PS Interpreter>

Figure 6:
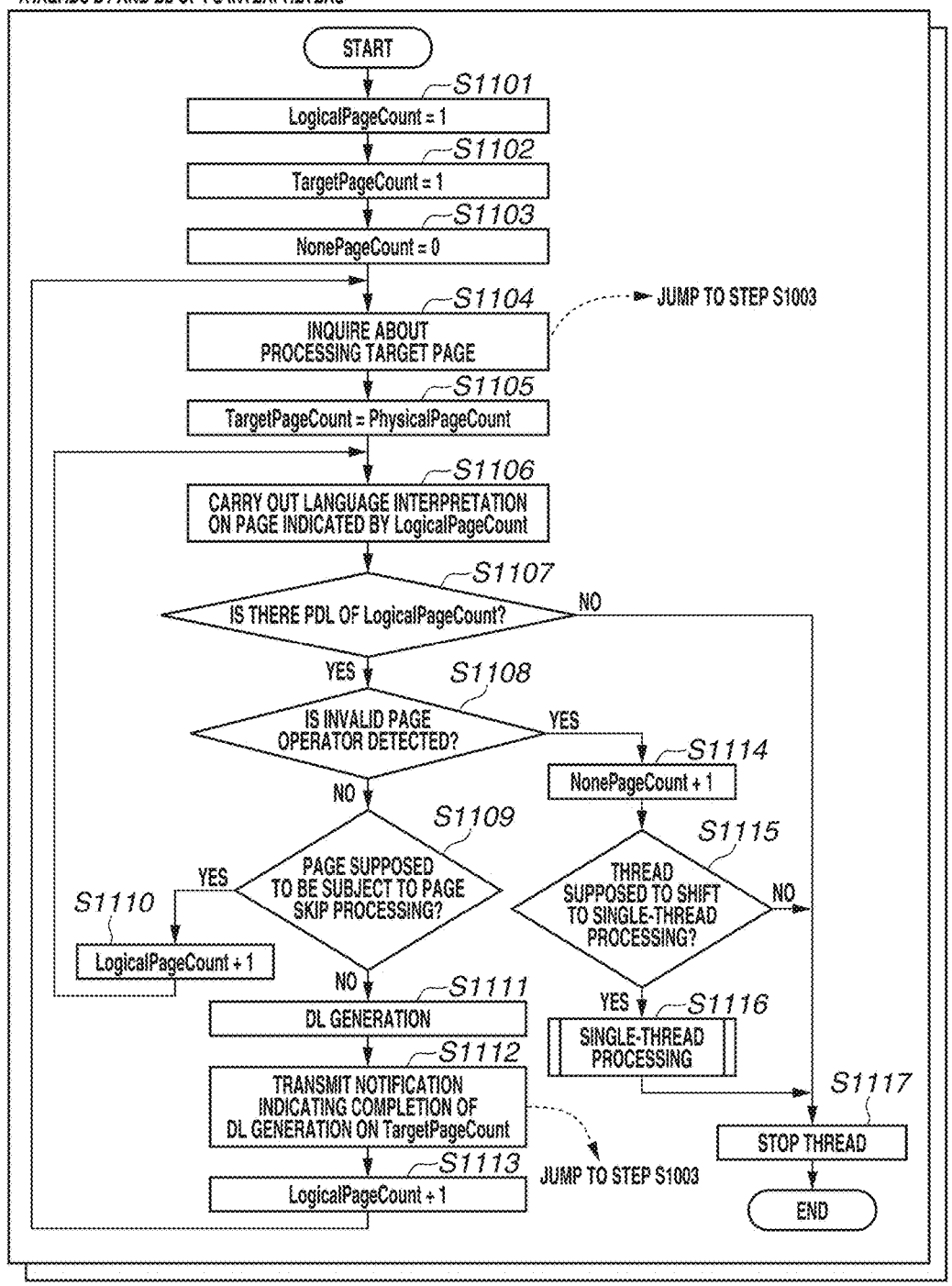
FIG. 6 is a flowchart illustrating the method for controlling the image forming apparatus.

FIG. 6 is a flowchart illustrating a method for controlling the image forming apparatus according to the present exemplary embodiment. This example is an example of parallel DL generation control performed at the threads B1 and B2 of the PS interpreters 201. The CPU 101 executes the stored control program, by which each step is realized.

Now, a configuration required to perform the present control and an overview of this control will be described. The PS interpreter 201 illustrated in FIG. 2 has three counter values, "LogicalPageCount", "TargetPageCount", and "NonePageCount" as internal page counters. "LogicalPageCount" is the counter value that indicates the logical page described with reference to FIG. 5, and is incremented as the language interpretation on the print data moves on to a next page.

"TargetPageCount" indicates the page number specified as the target of the page drawing processing. "NonePageCount" is a counter value that counts the number of page(s) containing "erasepage" detected by the page skip processing or the page drawing processing.

Upon receiving the page number specified as the processing target from the page parallel control unit 200, the PS interpreter 201 stores the value thereof into "TargetPageCount" and starts the processing. While "LogicalPageCount" is smaller than "TargetPageCount", the PS interpreter 201 continues the page skip processing while incrementing "LogicalPageCount". Then, only when "LogicalPageCount" becomes equal to "TargetPageCount", the PS interpreter 201 performs the page drawing processing to generate the DL for the first time. Upon ending the DL generation, the PS interpreter 201 transmits the notification indicating the completion together with the page number from which the DL has been generated to the page parallel control unit 200, and inquires about the page number specified as the next processing target.

However, if detecting the page containing "erasepage" during this processing, the PS interpreter 201 increments the "NonePageCount" value, and shifts to the single-thread processing. The thread that shifts to the single-thread processing may be any of the threads B1 and B2. When the threads B1 and B2 are launched by the page parallel control unit 200 in step S1002 illustrated in FIG. 5, the present processing is started.

First, in step S1101, the CPU 101 sets "LogicalPageCount", which is the internal page counter value, to "1" as initialization processing. Next, in step S1102, the CPU 101 sets "TargetPageCount", which is the internal page counter value, to "1" as the initialization processing. Next, in step S1103, the CPU 101 sets "NonePageCount", which is the internal page counter value, to "0" as the initialization processing.

Next, in step S1104, the CPU 101 inquires about the page number of the processing target page to the page parallel control unit 200, which corresponds to step S1003 of the page parallel control unit 200. When the CPU 101 is notified of the page number of the processing target page from the page parallel control unit 200, the processing proceeds to step S1105.

Next, in step S1105, the CPU 101 stores the value of the page number ("PhysicalPageCount") of the processing target page, which the CPU 101 has been notified of in step S1104, into "TargetPageCount", which is the internal page counter value. Next, in step S1106, the CPU 101 carries out the language interpretation on the print data of the page number indicated by "LogicalPageCount" by the PDL language interpretation unit 202.

Next, in step S1107, the CPU 101 determines whether there is print data (PDL) of the page number indicated by "LogicalPageCount" as a result of carrying out the language interpretation in step S1106. Then, a lack of the print data of the target page means that the processing on all of the pages contained in the print data has been completed. Therefore, if the CPU 101 determines that there is not the print data (NO in step S1107), the processing proceeds to step S1117 and end processing is performed. On the other hand, if the CPU 101 determines that there is the print data (YES in step S1107), the processing proceeds to step S1108 and continues.

Next, in step S1108, the CPU 101 determines whether "erasepage", which is the operator indicating the invalid page, is contained as the result of the language interpretation in step S1106. If the CPU 101 determines that "erasepage" is contained at this time (YES in step S1108), the processing proceeds to step S1114, and then the CPU 101 starts processing for shifting to the single thread. On the other hand, if the CPU 101 determines that "erasepage" is not contained (NO in step S1108), the processing proceeds to step S1109, and the CPU 101 continues normal processing.

Next, in step S1109, the CPU 101 determines whether the page number indicated by "LogicalPageCount" is a page supposed to be subjected to the page skip processing. The CPU 101 is assumed to make this determination at this time based on whether "LogicalPageCount" is smaller than "TargetPageCount". Then, if the CPU 101 determines that "LogicalPageCount" is smaller than "TargetPageCount" (YES in step S1109), the processing proceeds to step S1110 because the page skip processing should be performed. On the other hand, if the CPU 101 determines that "LogicalPageCount" is not smaller than "TargetPageCount" (i.e., "LogicalPageCount" is equal to "TargetPageCount") (NO in step S1109), the processing proceeds to step S1111 because the page drawing processing should be performed.

Next, in step S1110, the CPU 101 adds "1" to the value of "LogicalPageCount", thereby incrementing the page number of a target of the language interpretation processing. Then, the processing returns to step S1106 and is repeated.

Next, in step S1111, the CPU 101 generates the DL from the result of the language interpretation by the DL generation unit 203. Next, in step S1112, the CPU 101 notifies the page parallel control unit 200 that the DL generation processing on the page number indicated by "TargetPageCount" has been completed, which corresponds to step S1003 of the page parallel control unit 200.

Next, in step S1113, the CPU 101 adds "1" to the value of "LogicalPageCount", thereby incrementing the page number of the target of the language interpretation processing. After the page number is incremented, the processing returns to step S1104 and is repeated.

Next, in step S1114, the CPU 101 adds "1" to "NonePageCount", determining that the operator indicating the invalid page has been detected in step S1108.

Next, in step S1115, the CPU 101 determines whether the present thread is the thread supposed to shift to the single-thread processing. In the present example, the thread that shifts to the single-thread processing may be any of the threads B1 and B2. The CPU 101 performs control in such a manner that any one of the threads B1 and B2 is stopped, and the processing after that is processed in the single-threading manner. If the present thread is supposed to shift to the single thread and take over the processing on the page(s) after that (YES in step S1115), the processing proceeds to step S1116. If the present thread is not supposed to shift to the single-thread processing and the processing performed by this thread is supposed to be stopped (NO in step S1115), the processing proceeds to step S1117.

Next, in step S1116, the CPU 101 performs the processing for shifting to the single-thread processing. Details of this processing will be described in detail below with reference to FIG. 7. Next, in step S1117, the CPU 101 stops its own thread A, and stops the present processing. With this processing, the parallel DL generation control at the threads B1 and B2 by the PS interpreters 201 is performed.

<Single-Thread Processing Performed by PS Interpreter>

Figure 7:
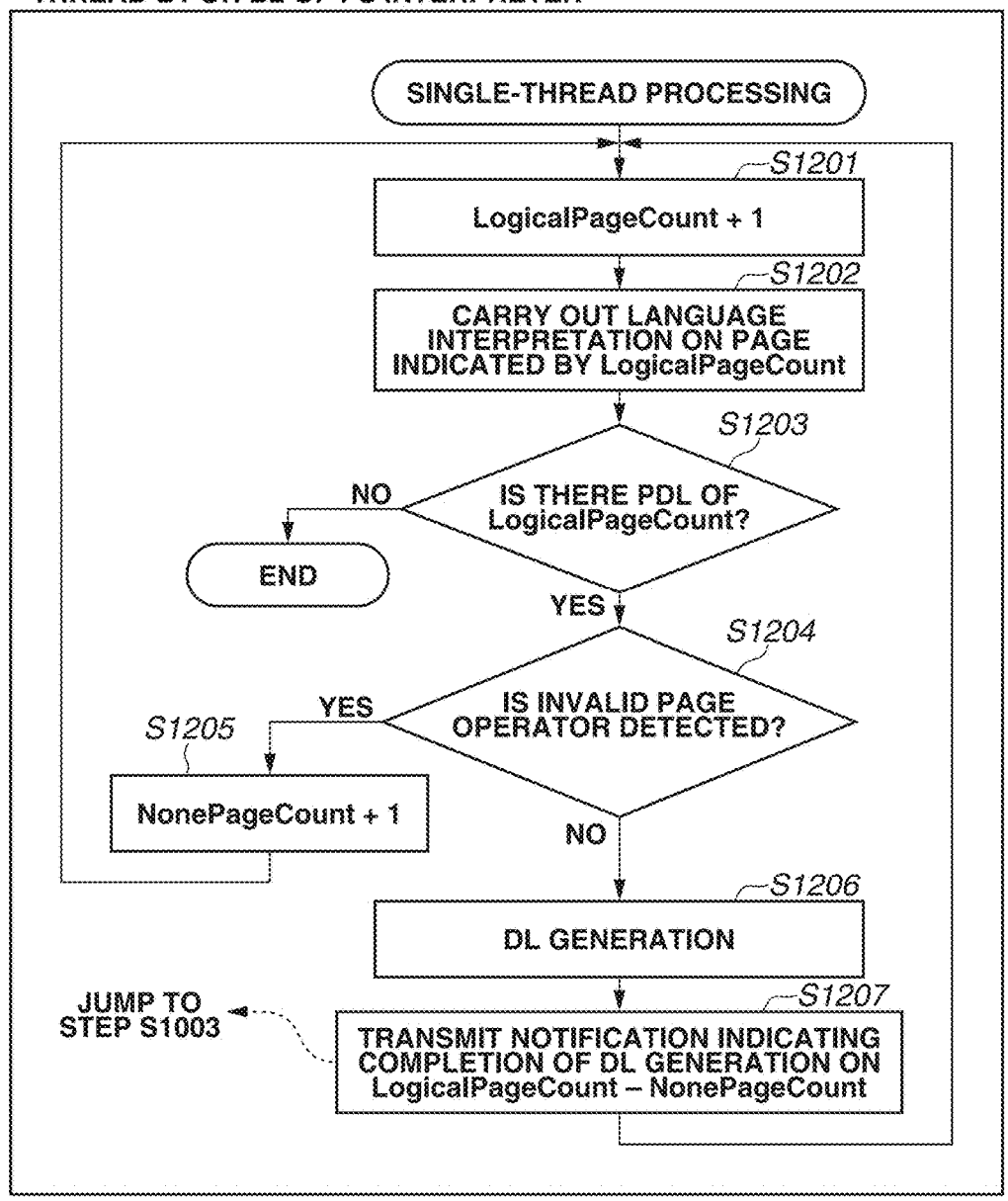
FIG. 7 is a flowchart illustrating the method for controlling the image forming apparatus.

FIG. 7 is a flowchart illustrating a method for controlling the image forming apparatus according to the present exemplary embodiment. The present example is an example of the single-thread processing at the thread B1 or the thread B2 that is performed by the PS interpreter 201. The CPU 101 executes the stored control program, by which each step is realized. Now, the operation will be described assuming that a performer thereof is the module executed by the CPU 101.

Now, a configuration required to perform the present control and an overview of this control will be described. After the processing shifts to the single-thread processing in step S1116, the processing on the remaining page(s) is continuously performed by only any one of the threads B1 and B2 launched by the page parallel control unit 200 in step S1002. Further, after the shift to the single-thread processing, the PS interpreter 201 only transmits the notification indicating the completion of the DL generation and does not inquire about the processing target page to the page parallel control unit 200. The PS interpreter 201 starts incrementing the page counter value internally, thereby preventing the occurrence of the inconsistency in the page counter value due to the detection of the invalid page. Upon the start of the processing in step S1116 illustrated in FIG. 6, the present processing is started.

First, in step S1201, the CPU 101 adds "1" to the value of "LogicalPageCount", thereby incrementing the page number of the target of the language interpretation processing. Next, in step S1202, the CPU 101 carries out the language interpretation on the print data of the page number indicated by "LogicalPageCount" by the PDL language interpretation unit 202.

Next, in step S1203, the CPU 101 determines whether there is the print data (PDL) of the page number indicated by "LogicalPageCount" as a result of carrying out the language interpretation in step S1203. A lack of the print data of the target page means that the processing on all of the pages contained in the print data has been completed. Therefore, if the CPU 101 determines that there is not the print data (NO in step S1203), the present processing is ended. On the other hand, if the CPU 101 determines that there is the print data (YES in step S1203), the processing proceeds to step S1204 and continues.

Next, in step S1204, the CPU 101 determines whether "erasepage", which is the operator indicating the invalid page, is contained as the result of the language interpretation in step S1202. If the CPU 101 determines that "erasepage" is contained at this time (YES in step S1204), the processing proceeds to step S1205. On the other hand, if the CPU 101 determines that "erasepage" is not contained (NO in step S1204), the processing proceeds to step S1206.

Next, in step S1205, the CPU 101 adds "1" to "NonePageCount", determining that the operator indicating the invalid page has been detected in step S1204. After that, the processing returns to step S1201 and is repeated.

Next, in step S1206, the CPU 101 generates the DL from the result of the language interpretation by the DL generation unit 203.

Next, in step S1207, the CPU 101 notifies the page parallel control unit 200 that the DL generation has been completed. At this time, the CPU 101 notifies the page parallel control unit 200 of the page number acquired by subtracting "NonePageCount", which indicates the number of invalid page(s), from "LogicalPageCount", which indicates the page that has been processed as the target of the language interpretation in step S1202, thereby resolving a difference in the page counter value due to the invalid page to make the pages consistent.

With this processing, the single-thread processing at the thread B1 or the thread B2 by the PS interpreter 201 is normally performed.

In the image forming apparatus including the CPU 101 employing the multi-core system according to the present exemplary embodiment, the PS interpreter 201 immediately shifts to the single-thread processing and takes over the processing after that when detecting the invalid page while performing the print processing in the multi-threading manner. Then, after the shift to the single-thread processing, the PS interpreter 201 does not have to inquire about the page of the processing target to the page parallel control unit 200, and proceeds with the processing while autonomously controlling the page counter value.

With this method, it is possible to avoid the inconsistency in the page control due to the fact that the page parallel control unit 200 is unequipped with the measures for detecting the invalid page, when processing the print data containing the invalid page.

In the first exemplary embodiment, the single-thread processing is performed for the processing subsequent to the page at which the invalid page is contained, so that parallel calculation resources of the CPU 101 employing the multi-core system cannot be utilized any longer after the shift to the single thread. Therefore, a second exemplary embodiment employs different parallel processing (the pipeline parallelism) that is different from the page parallel technique in terms of a unit based on which the parallel processing is performed after the shift to the single thread, thereby realizing full utilization of the parallel calculation resources without waste.

Figure 8:
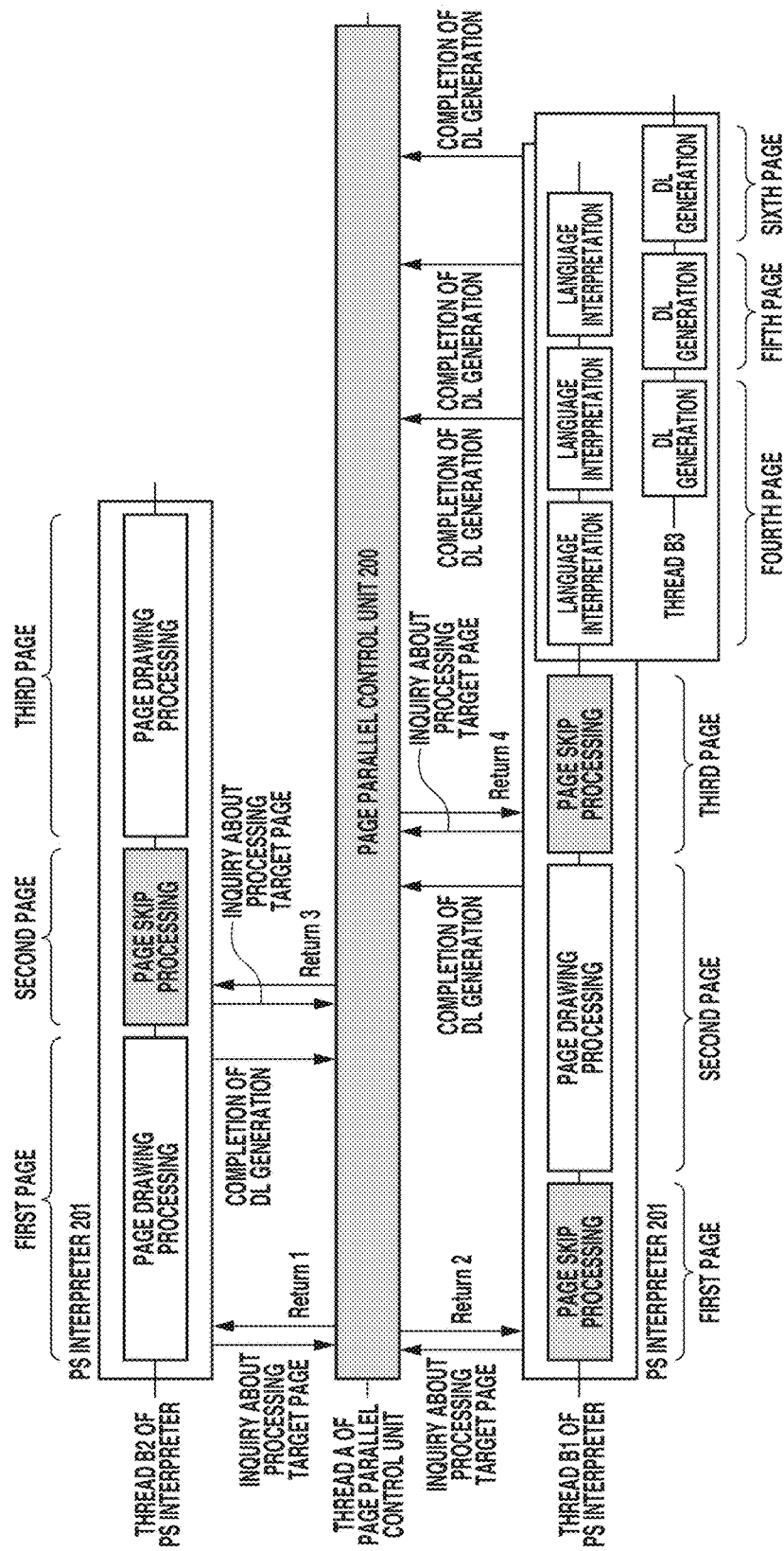
FIG. 8 is a brief sequence diagram illustrating page parallel processing according to an exemplary embodiment of the present disclosure.

FIG. 8 is a brief sequence diagram illustrating an example of drawing by the image forming apparatus according to the present exemplary embodiment. This is a brief sequence diagram in a case where the pipeline parallel processing is also employed in addition to the processing for shifting to the single thread after the invalid page is detected by the image forming apparatus according to the present exemplary embodiment. The pipeline parallelism, which is the different parallel processing from the page parallel technique in terms of the unit based on which the parallel processing is performed, is a technique that performs the pipeline parallel processing by dividing the language interpretation processing and the DL generation processing in the processing performed by the PS interpreter 201 into former processing and latter processing and distributing them to threads.

In the example illustrated in FIG. 8, there is an invalid page at the third page, and the PS interpreter 201 shifts to the single-thread processing for the processing on the fourth page and the pages after that. At this time, a thread for the DL generation processing is newly launched as a thread B3, and the DL generation processing is assigned thereto after the language interpretation processing on the fourth page that is performed by the thread B1. The thread B1 immediately starts the language interpretation processing on a next fifth page without waiting for completion of the DL generation processing performed by the thread B3. After that, the parallel processing is performed in a pipeline manner with the thread B1 in charge of the language interpretation processing and the thread B3 in charge of the DL generation processing until the processing reaches the last page.

In this manner, the employment of the page parallel processing before the shift to the single-thread processing and the employment of the pipeline parallel processing after the shift to the single thread enable the parallel calculation resources of the CPU 101 to be fully utilized without waste.

In the first exemplary embodiment and the second exemplary embodiment, the single-thread processing is performed for the processing subsequent to the page at which the invalid page is contained, whereby a later page than the invalid page is not processed prior to the invalid page. Therefore, the page re-sorting control for making the pages consistent can be realized simply within only the PS interpreter 201. As another solution, a third exemplary embodiment will illustrate an example in which the page re-sorting control for resolving the different due to the invalid page to make the pages consistent is performed on the page parallel control unit 200 side. In this example, even after the invalid page is detected, the page parallel processing can continue in the multi-threading manner. However, a later page than the invalid page may be processed prior to the invalid page, which leads to the necessity of holding a table for managing a status of the processing performed by each of the threads, such as a table illustrated in FIG. 11. In addition, also raised necessity is proceeding with the processing while managing specifically what number page the invalid page is contained at with use of the same page management table.

<Page Management Table>

FIGS. 9A, 9B, 9C, and 9D each illustrate a page management table in the image forming apparatus according to the present exemplary embodiment. This example will be described referring to a page management table managed in common between the page parallel control unit 200 and the PS interpreter 201. As described above, in the present exemplary embodiment, even when the operator indicating the invalid page is detected, this detection does not trigger the shift to the single thread since the re-sorting processing on the processed pages is performed by the page parallel control unit 200. To realize that, the page parallel control unit 200 should manage at what number page the invalid page is contained in terms of the page number, and recognize the status of the processing performed by each of the threads operating in the multi-threading manner. The page re-sorting processing performed by the page parallel control unit 200 is realized by performing processing for assigning an output page after referring to information in the page management table at a timing of the notification indicating the completion of the DL generation from the PS interpreter 201 operating as each of the threads.

Upon receiving the notification indicating the completion of the DL generation from the thread executed by the PS interpreter 201, the page parallel control unit 200 checks the status of the processing performed by the other thread by referring to the page management table. If the processing performed by the other thread is currently processing a page number prior to the page number with respect to which the notification indicating the completion of the DL generation has been received, the page parallel control unit 200 cannot determine whether the invalid page is contained at this prior page. Therefore, even for the page for which the DL generation has been completed, the page parallel control unit 200 cannot yet determine at this stage what number page this page should be finally assigned to in the output pages. Therefore, the page parallel control unit 200 does not transfer the DL to the rendering unit 205 and buffers (stores) this DL into the buffer area, and moves on to the processing on the next page.

On the other hand, if the processing performed by the other thread is currently processing a later page number than the page for which the DL generation has been completed, the language interpretation processing has been completed and the determination of whether the invalid page is contained has been completed as far as a page immediately after the page that the other thread is currently processing.

Therefore, in this case, the page parallel control unit 200 performs the processing for assigning the output page, thereby determining what number page each DL held in the buffer area is finally assigned to among the output pages based on the information in the page management table.

The page management table includes four fields "PageID", "Status", "Output", and "OutputPage". "PageID" is a page identification (ID) for uniquely determining the logical page contained in the print data. "Status" holds processing state information indicating whether the processing on this page is completed ("Complete"), is ongoing (Running), or is unprocessed (-), which is detected based on the information received from the PS interpreter 201. "Output" holds information indicating whether this page is the invalid page (True/False). For example, if the page contains "erasepage", "Output" is set to "False". "OutputPage" holds information indicating what number page (what number sheet) this page is output on in terms of the page number of the output page. If this page is the invalid page, "OutputPage" is set to a value of "none".

FIG. 9A illustrates the page management table when the image forming apparatus is in such a state that a second logical page and a sixth logical page are in process, and it is confirmed that the invalid page is contained at a fourth page. For a page having "PageID" set to 1, the "OutputPage" field, which will be used as a final output page number, can be set to 1 because the language interpretation processing performed by the PS interpreter 201 has been already completed therefor and the invalid page is not contained thereat. However, for pages having "PageID" set to 3 and 5, respectively, final output page numbers cannot be determined yet at this stage because the language interpretation processing on the second page has not been completed and therefore whether the second page is the invalid page cannot be determined.

FIG. 9B illustrates the page management table when the image forming apparatus transitions from the state illustrated in FIG. 9A to a state in which the processing on the page having "PageID" set to 2 has been completed. For the pages as far as the page having "PageID" set to 5, the "OutputPage" field can be updated because the language interpretation processing has been completed for all of them. In this example, the invalid page is newly detected at the page having "PageID" set to 2, so that "OutputPage" is set to 2 and 3 for the page having "PageID" set to 3 and the page having "PageID" set to 5, respectively.

FIG. 9C illustrates the page management table with the processing further progressed and the language interpretation processing completed for the pages other than the page having "PageID" set to 6. In this case, for pages after the page having "PageID" set to 6, the "OutputPage" field cannot be updated even though the language interpretation processing has been completed therefor, because whether the page having "PageID" set to 6 is the invalid page cannot be determined yet similarly to the page having "PageID" set to 2 illustrated in FIG. 9A.

FIG. 9D illustrates information in the page management table when the language interpretation processing on all of the pages has been completed. Only after the image forming apparatus is brought into this state, "OutputPage" can be determined for the pages from the page having "PageID" set to 6 to a page having "PageID" set to 8, which is a last page. In this example, the invalid page is detected again at the page having "PageID" set to 6, so that "OutputPage" is set to 4 and 5 for a page having "PageID" set to 7 and the page having "PageID" set to 8, respectively.

<Page Control Performed by Page Parallel Control Unit>

Figure 10:
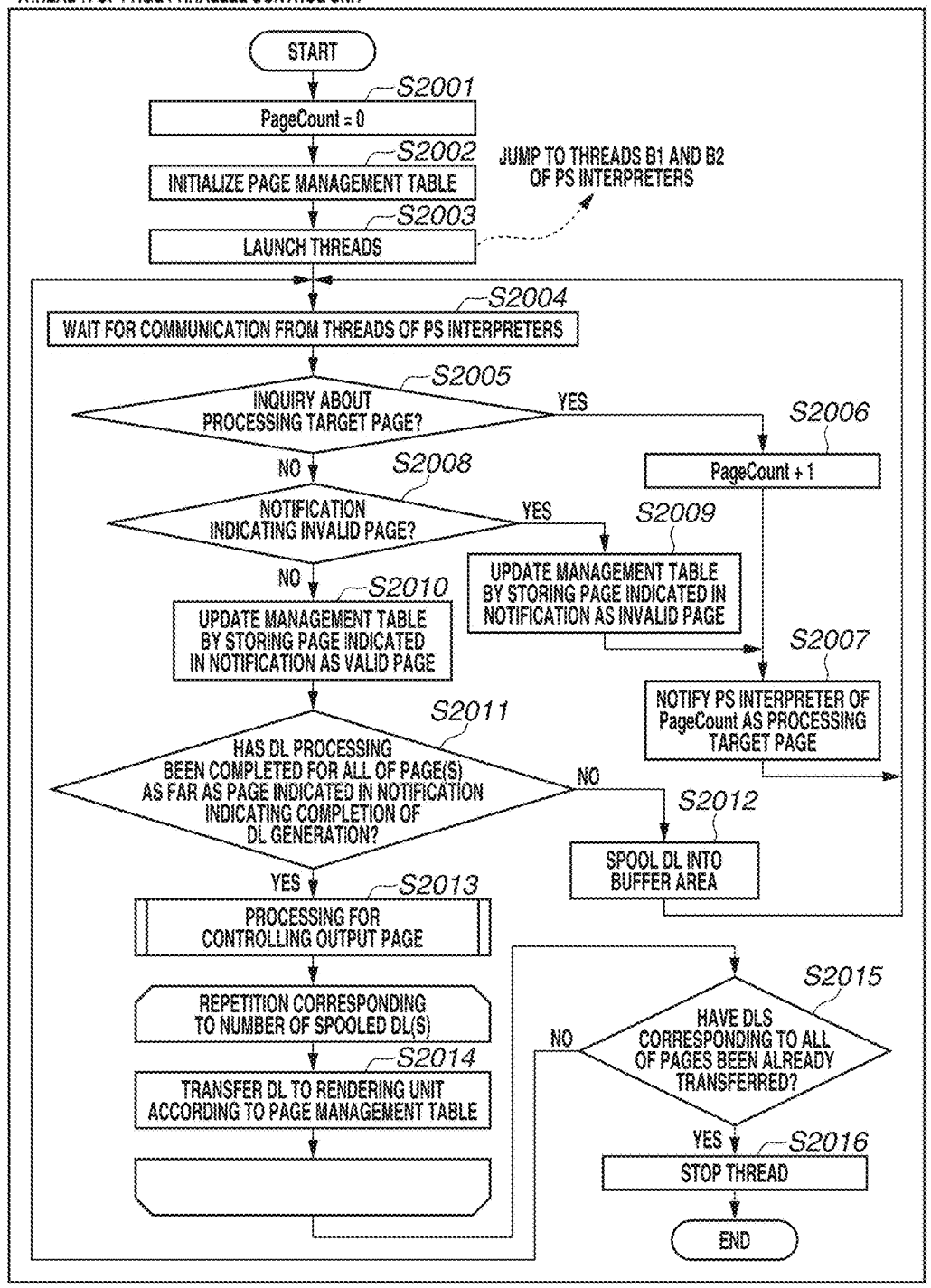
FIG. 10 is a flowchart illustrating a method for controlling the image forming apparatus.

FIG. 10 is a flowchart illustrating a method for controlling the image forming apparatus according to the present exemplary embodiment. This example is an example of the page control of the page parallel processing performed by the page parallel control unit 200. The CPU 101 executes the stored control program, by which each step is realized. Further, the page parallel control unit 200 according to the present exemplary embodiment has "PageCount" as an internal page counter value for the page control, similarly to the first exemplary embodiment. In the first exemplary embodiment, the page parallel control unit 200 has "PhysicalPageCount", and controls the physical page number for controlling on what number sheet (physical page) the result of drawing the page is laid out in the output product for each page. However, in the present exemplary embodiment, the output page is controlled with use of the page management table, whereby "PhysicalPageCount" is unnecessary in the present exemplary embodiment.

Further, the page parallel control unit 200 according to the present exemplary embodiment further includes the page management table managed in common with the PS interpreter 201, in which the status of the processing performed by each of the threads and the page number at which the invalid page is contained are managed. Upon reception of the print data via the Network 104, the present processing is started by the CPU 101.

First, in step S2001, the CPU 101 sets "0" into "PageCount" as initialization processing. Next, in step S2002, the CPU 101 generates the page management table described with reference to FIGS. 9A to 9D, thereby performing the initialization processing. Next, in step S2003, the CPU 101 launches the threads B1 and B2 illustrated in FIG. 11, which will be described below, and assigns the PS interpreters 201 to them, respectively.

Next, in step S2004, the CPU 101 waits for the communication from the PS interpreters 201 launched in step S2003. At this time, the CPU 101 waits for communication that is any of the inquiry about the page with respect to the processing target, a notification indicating the detection of the invalid page, and the notification indicating the completion of the DL generation from the PS interpreters 201. Upon reception of any notification of these three notifications from the thread B1 or B2 of the PS interpreter 201, the processing proceeds to step S2005.

Next, in step S2005, the CPU 101 determines whether the communication received from the PS interpreter 201 in step S2004 is the inquiry about the processing target page. If the CPU 101 determines that the received communication is the inquiry about the processing target page (YES in step S2005), the processing proceeds to step S2006. On the other hand, if the CPU 101 determines that the received communication is not the inquiry about the processing target page (NO in step S2005), the processing proceeds to step S2008. Next, in step S2006, the CPU 101 adds "1" to the "PageCount" value, thereby incrementing the page number to be specified as the next processing target page.

Next, in step S2007, the CPU 101 notifies the PS interpreter 201 of the value of "PageCount", which is the internal page counter value, as the processing target page. After that, the processing returns to step S2004.

Next, in step S2008, the CPU 101 determines whether the communication received from the PS interpreter 201 in step S2004 is the notification indicating the invalid page. If the CPU 101 determines that the received communication is the notification indicating the invalid page (YES in step S2008), the processing proceeds to step S2009. On the other hand, if the CPU 101 determines that the received communication is not the notification indicating the invalid page (NO in step S2008), i.e., the received communication is the notification indicating the completion of the DL generation, the processing proceeds to step S2010.

Next, in step S2009, the CPU 101 updates the page management table by determining the target page that the CPU 101 has been notified of as the invalid page in step S2008 as the invalid page. The CPU 101 updates the "Status" field into "Complete", and the "Output" field into "False".

Next, in step S2010, the CPU 101 reflects, into the page management table, the information about the target page with respect to which the notification indicating the completion of the DL generation has been received in step S2008. The CPU 101 updates the "Status" field into "Complete" and the "Output" field into "True".

Next, in step S2011, the CPU 101 determines whether the DL (language interpretation) processing has been completed for all of the page(s) as far as the page number with respect to which the notification indicating the completion of the DL generation has been received in step S2008, by referring to the page management table. If the CPU 101 determines that the DL (language interpretation) processing has been completed for all of the page(s) at this time (YES in step S2011), the processing proceeds to step S2013. On the other hand, if the CPU 101 determines that the DL (language interpretation) processing has not been completed for all of the page(s) (NO in step S2011), the processing proceeds to step S2012.

Next, in step S2012, the CPU 101 spools the generated DL into the buffer area of the buffer 204. Upon completion of the spooling, the processing returns to step S2004. Next, in step S2013, the CPU 101 performs processing for controlling the output page by referring to the page management table. Details of this processing will be described in detail below with reference to FIG. 12.

Next, in step S2014, the CPU 101 transfers the DL(s) spooled in the buffer 204 to the rendering unit 205 according to the order indicated in "OutputPage" in the page management table.

Next, in step S2015, the CPU 101 determines whether the DLs of all of the pages contained in the print data have been transferred. The CPU 101 can make this determination based on whether the threads B1 and B2 launched in step S2003 are stopped. If the CPU 101 determines that the DLs of all of the pages contained in the print data have been transferred at this time (YES in step S2015), the processing proceeds to step S2106. On the other hand, if the CPU 101 determines that not the DLs of all of the pages contained in the print data have been able to be transferred (NO in step S2015), the processing returns to step S2004 and is repeated.

Next, in step S2016, the CPU 101 stops its own thread A. Then, the present processing is ended. With this processing, the page control of the page parallel processing by the page parallel control unit 200 is performed.

<Parallel DL Generation Control Performed by PS Interpreter>

Figure 11:
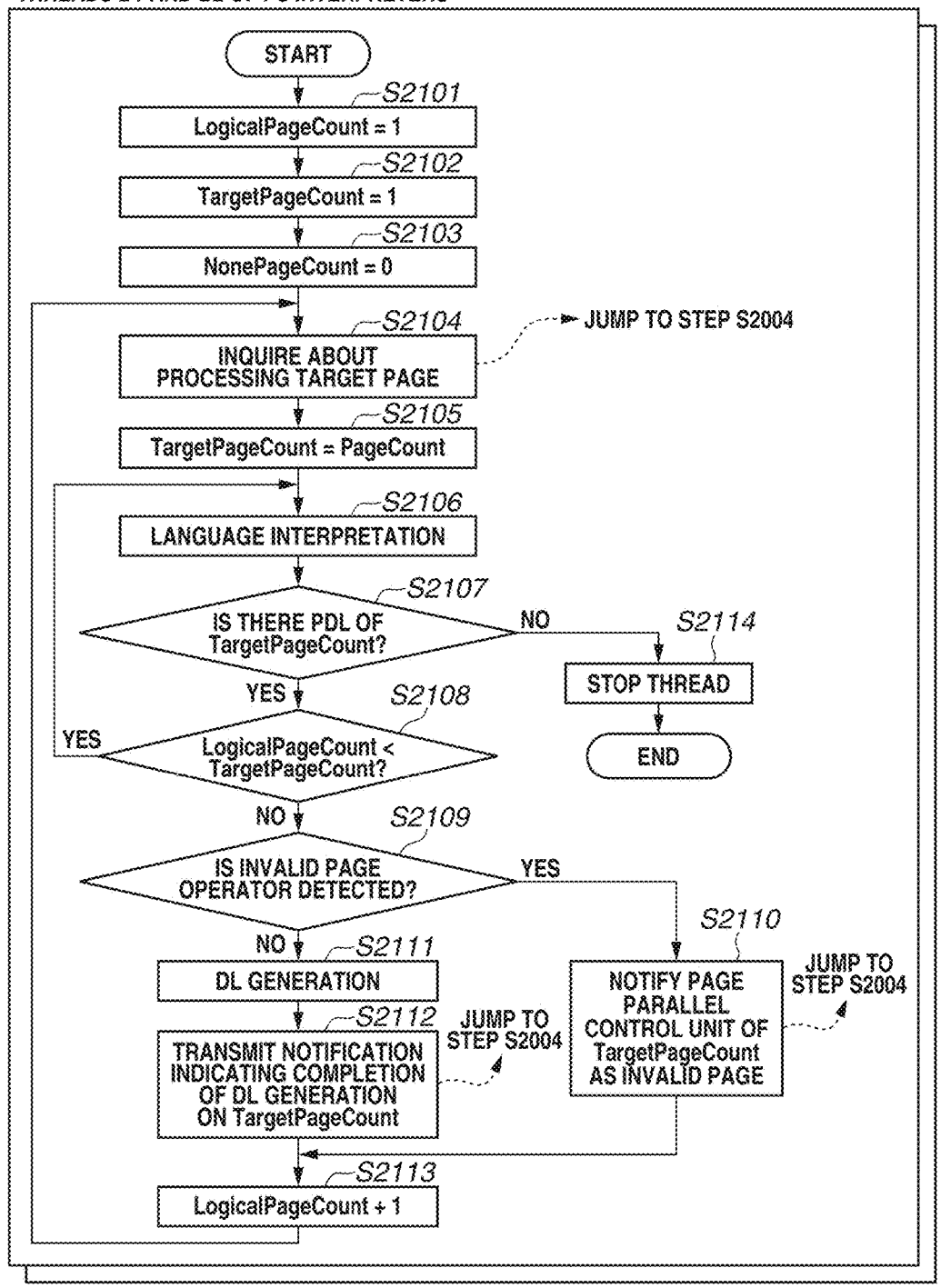
FIG. 11 is a flowchart illustrating the method for controlling the image forming apparatus.

FIG. 11 is a flowchart illustrating a method for controlling the image forming apparatus according to the present exemplary embodiment. This example is an example of parallel DL generation control performed at the threads B1 and B2 of the PS interpreters 201. The CPU 101 executes the stored control program, by which each step is realized.

Similar to the first exemplary embodiment, the PS interpreter 201 has the three counter values "LogicalPageCount", "TargetPageCount", and "NonePageCount" as the internal page counters. The value indicated by each of the counters is similar to that of the first exemplary embodiment.

Unlike the first exemplary embodiment, in the present exemplary embodiment, the PS interpreter 201 dose not perform the page re-sorting processing for the page control, and proceeds with the processing as far as the processing target page that the PS interpreter 201 is instructed to process from the page parallel control unit 200 and notifies the page parallel control unit 200 of whether the DL generation has been normally completed or whether the invalid page is detected.

Then, upon ending the notification to the page parallel control unit 200, the PS interpreter 201 inquires about the page specified as the next processing target. The PS interpreter 201 repeats these processing procedures. Then, upon ending the processing on all of the pages contained in the print data, the PS interpreter 201 stops its own thread and ends the processing. In step S2003 illustrated in FIG. 10, the threads B1 and B2 are launched by the page parallel control unit 200, upon which the present processing is started.

First, in step S2101, the CPU 101 sets "LogicalPageCount", which is the internal page counter value, to "1" as the initializing processing. Next, in step S2101, the CPU 101 sets "TargetPageCount", which is the internal page counter value, to 1 as the initializing processing. Next, in step S2103, the CPU 101 sets "NonePageCount", which is the internal page counter value, to "0" as the initializing processing.

Next, in step S2104, the CPU 101 inquires about the page number of the processing target page to the page parallel control unit 200. When the CPU 101 is notified of the page number of the processing target page from the page parallel control unit 200, the processing proceeds to step S2105.

Next, in step S2105, the CPU 101 stores the value of the page number ("PageCount") of the processing target page, which the CPU 101 has been notified of in step S2104, into "TargetPageCount", which is the internal page counter value. Next, in step S2106, the CPU 101 carries out the language interpretation on the print data of the page number indicated by "LogicalPageCount" by the PDL language interpretation unit 202.

Next, in step S2107, the CPU 101 determines whether there is the print data (PDL) of the page number indicated by "LogicalPageCount" as a result of carrying out the language interpretation in step S2106. A lack of the print data of the target page means that the processing on all of the pages contained in the print data has been completed. Therefore, if the CPU 101 determines that there is not the print data (NO in step S2107), the processing proceeds to step S2114 and the end processing is performed. On the other hand, if the CPU 101 determines that there is the print data (YES in step S2107), the processing proceeds to step S2108 and continues.

Next, in step S2108, the CPU 101 determines whether "LogicalPageCount" is smaller than "TargetPageCount". If the CPU determines that "LogicalPageCount" is smaller than "TargetPageCount" at this time (YES in step S2108), the processing does not proceed to step S2109 but returns to step S2106 and is repeated because the processing applicable to this logical page is the page skip processing. On the other hand, if the CPU 101 determines that "LogicalPageCount" is not smaller than "TargetPageCount" (i.e., "LogicalPageCount" is equal to "TargetPageCount") (NO in step S2108), the processing proceeds to step S2109 because the page drawing processing should be performed.

Next, in step S2109, the CPU 101 determines whether "erasepage", which is the operator indicating the invalid page, is contained as the result of the language interpretation in step S2106. If the CPU 101 determines that "erasepage" is contained at this time (YES in step S2109), the processing proceeds to step S2110. On the other hand, if the CPU 101 determines that "erasepage" is not contained (NO in step S2109), the processing proceeds to step S2111.

Next, in step S2110, the CPU 101 notifies the page parallel control unit 200 that the page indicated by "TargetPageCount" is the invalid page. Next, in step S2111, the CPU 101 generates the DL from the result of the language interpretation by the DL generation unit 203. Next, in step S2112, the CPU 101 notifies the page parallel control unit 200 that the DL generation processing on the page number indicated by "TargetPageCount" has been completed, which corresponds to step S2004 of the page parallel control unit 200.

Next, in step S2113, the CPU 101 adds 1 to the value of "LogicalPageCount", thereby incrementing the page number of the processing target. After the page number is incremented, the processing returns to step S2104 and is repeated.

Next, in step S2114, the CPU 101 stops its own tread A. Then, the present processing is ended. With this processing, the parallel DL generation control at the threads B1 and B2 by the PS interpreters 201 is performed.

<Single-Thread Processing Performed by PS Interpreter>

FIG. 12 is a flowchart illustrating a method for controlling the image forming apparatus according to the present exemplary embodiment. This example is an example of the processing for controlling the output page at the thread A that is performed by the page parallel control unit 200. The CPU 101 executes the stored program, by which each step is realized.

In the processing for controlling the output page, the page parallel control unit 200 includes the page management table illustrated in FIG. 9, and further has counter values of "MinPageCount", "MaxPageCount", and "FixedPageCount" as internal page counters. "MinPageCount" is a maximum value of "PageID" corresponding to which the "OutputPage" field in the page management table is determined, as of the start of the present processing. "MaxPageCount" is a maximum value of the page number for which the DL processing performed by the PS interpreter 201 has been completed in the page management table. "FixedPageCount" is a maximum value of the value stored in the "OutputPage" field. The page parallel control unit 200 determines "MinPageCount" by referring to the page management table at the time of the start of the present processing, and stores the value in the "OutputPage" field corresponding to "MinPageCount" into "FixedPageCount".

The page parallel control unit 200 determines whether the DL generation processing has been completed for a later page than the page for which the processing has been completed when the notification indicating the completion of the DL generation is received from the PS interpreter 201, by referring to the page management table. If the DL generation on a later page has been completed, the page parallel control unit 200 stores maximum "PageID" corresponding to which the "Status" field is set to "Complete", into "MaxPageCount". If the DL generation on a later page has not been completed, the page parallel control unit 200 stores the page for which the processing has been completed that is indicated in the notification indicating the completion of the DL generation, into "MaxPageCount".

After that, the page parallel control unit 200 continues determining the value in "OutputPage" based on whether the "Output" field is set to "True" or "False" from "MinPageCount" to "MaxPageCount". Upon the start of the processing in step S2013 illustrated in FIG. 10, the present processing is started.

First, in step S2201, the CPU 101 determines "MinPageCount", which is the internal page counter, by referring to the page management table. The CPU 101 stores the maximum value of "PageID" corresponding to which the "OutputPage" field is determined, from the information in the page management table into "MinPageCount". In the case of the example illustrated in FIGS. 9A, 9B, 9C, and 9D, the page having "PageID" set to 1 is the maximum value in FIG. 9A, the page having "PageID" set to 5 is the maximum value in FIGS. 9B and 9C, and the page having "PageID" set to 8 is the maximum value in FIG. 9D, so that step S2201 results in storage of this value into "MinPageCount".

Next, in step S2202, the CPU 101 determines "FixedPageCount" by referring to the page management table. The value in the "OutputPage" field corresponding to "PageID" stored in "MinPageCount" is stored into "FixedPageCount". In the case of the examples illustrated in FIGS. 9A, 9B, 9C, and 9D, step S2202 results in storage of 1, 3, and 5 in FIGS. 9A, 9B and 9C, and 9D, respectively.

Next, in step S2203, the CPU 101 determines whether the DL generation processing has been completed for "PageID" of a later page than the page number for which the DL generation has been completed that has been received from the PS interpreter 201 in step S2004 illustrated in FIG. 10, by referring to the page management table. If the CPU 101 determines that the DL generation processing on a later page has been completed at this time (YES in step S2203), the processing proceeds to step S2204. On the other hand, if the CPU 101 determines that the DL generation processing on a later page has not been completed (NO in step S2203), the processing proceeds to step S2205.

In this step, the CPU 101 determines which value is employed to store the value into "MaxPageCount". As described above, "MaxPageCount" is the maximum value of the page number for which the DL processing performed by the PS interpreter 201 has been completed in the page management table.

In step S2203, the CPU 101 determines whether the page number for which the DL generation has been completed that has been received from the PS interpreter 201 is also the maximum value of the page number for which the DL generation processing has been completed in the page management table, or the processing on a later page number than that has been already completed. The CPU 101 can determine whether the DL generation processing has been completed for a later page than the page number for which the DL generation has been completed by referring to the value corresponding to which the "Status" field is set to "Complete" and "PageID" is set to the maximum value in the page management table.

Therefore, if the CPU 101 determines that the processing on a later page number than that has been already completed (YES in step S2203), in step S2204, the CPU 101 stores the value corresponding to which the "Status" field is set to "Complete" and "PageID" is set to the maximum value in the page management table, as the value of "MaxPageCount".

On the other hand, in step S2205, since the value that the CPU 101 has been notified of from the PS interpreter 201 in step S2004 is the maximum value of the page number for which the DL processing has been completed, the CPU 101 stores this value into "MaxPageCount".

After that, in steps from S2206 to S2209, the CPU 101 repeats the processing for determining the value in "OutputPage" in the page management table while incrementing the "PageID" value one by one from "MinPageCount" to "MaxPageCount".

Next, in step S2206, the CPU 101 determines whether the "Output" field is set to "True". If the CPU 101 determines that the "Output" field is set to "True" at this time (YES in step S2206), the processing proceeds to step S2208. If the CPU 101 determines that the "Output" field is set to "False" (NO in step S2206), the processing proceeds to step S2207.

Next, in step S2207, the CPU 101 sets the value in "OutputPage" to "none". Next, in step S2208, the CPU 101 increments the value of "FixedOutputPage" by one. Next, in step S2209, the CPU 101 sets the value in "OutputPage" to the value of "FixedOutputPage". After steps S2206 to S2209 are processed for the pages from "MinPageCount" to "MaxPageCount", the present processing is ended. With this processing, the processing for controlling the output page at the thread A by the page parallel control unit 200 is performed.

The image forming apparatus including the CPU 101 employing the multi-core system according to the present exemplary embodiment performs the print processing in the multi-threading manner and performs the page re-sorting processing when detecting the invalid page, while using the page management table. In other words, the present exemplary embodiment allows the image forming apparatus to perform the multi-thread processing even after detecting the invalid page, and therefore is more advantageous than the first exemplary embodiment in terms of the parallelism and the processing performance.

In each of the above-described exemplary embodiments, the "erasepage" operator of PostScript (registered trademark) has been cited as the PDL command that indicates the invalid page by way of example. However, the range to which the present disclosure is applicable is not limited to this operator, and the present disclosure is also applicable even to an operator or command of another PDL that indicates a similar meaning.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-129996, filed Jun. 29, 2015, which is hereby incorporated by reference herein in its entirety.

What is claimed is:

1. An image forming apparatus configured to process print data of a plurality of pages, the image forming apparatus comprising:
one or more controllers, having at least one processor that executes a program or having at least one application specific integrated circuit, configured to function as:

a plurality of interpreters configured to generate intermediate data of the plurality of pages by interpreting the print data; and a control component configured to cause one of the plurality of interpreters to generate the intermediate data of a page of the plurality of pages;

wherein a raster image of a page based on the generated intermediate data is generated, and wherein, based on an interpretation of a predetermined command instructing the image forming apparatus not to output data for a page being subject to the predetermined command, any one interpreter of the plurality of interpreters generates the intermediate data of pages subsequent to the page being subject to the predetermined command, and the rest of the plurality of interpreters do not generate the intermediate data of the pages subsequent to the page being subject to the predetermined command.

2. The image forming apparatus according to claim 1, wherein the any one interpreter requires the control component to specify a page subject to generation of intermediate data before the interpretation for the invalid page, and stops the requiring after the interpretation for the invalid page.

3. The image forming apparatus according to claim 2, wherein the control component stops the specifying after the interpretation for the invalid page.

4. The image forming apparatus according to claim 1, wherein the one interpreter notifies the control component that the intermediate data of the page subsequent to this invalid page is generated, together with a number of this page.

5. The image forming apparatus according to claim 1,
wherein the control component controls whether to process the generated intermediate data of one or more pages according to the page number that the control component is notified of from the interpreter, and
wherein the one interpreter that generates the intermediate data of the page subsequent to the invalid page determines the page number that the one interpreter notifies the control component of according to a number of interpreted invalid page(s).

6. The image forming apparatus according to claim 1, wherein the print data is written in a predetermined page description language.

7. A method for processing print data of a plurality of pages including a page being subjected to a predetermined command instructing an image forming apparatus not to output data for a page being subject to the predetermined command, the method comprising:
generating, by a plurality of interpreters, intermediate data of the plurality of pages;
according to completion of generation of intermediate data of a page by a corresponding interpreter, specifying a page subject to generation of intermediate data to notify the corresponding interpreter of the specified page; and
generating image data of the respective pages from the generated intermediate data,
wherein the generation of the intermediate data includes, based on the interpretation for the page being subjected to the predetermined command, any one interpreter of the plurality of interpreters generates the intermediate data of pages subsequent to the page being subjected to the predetermined command, and the rest of the plurality of interpreters does not generate the intermediate data of the pages subsequent to the page being subjected to the predetermined command.

8. An image forming apparatus configured to process print data of a plurality of pages, the image forming apparatus comprising:
one or more controllers, having at least one processor that executes a program or having at least one application specific integrated circuit, configured to function as:
a plurality of interpreters configured to generate intermediate data of the plurality of pages by interpreting the print data; and
a control component configured to specify different pages for different interpreters, and, for each specified page, cause a corresponding interpreter to generate the intermediate data of the specified page;
wherein a raster image of each specified page based on the generated intermediate data is generated, and
wherein, based on the interpretation for an invalid page, the intermediate data of all pages subsequent to the invalid page is generated not according to the processing of the plurality of interpreters specified by the control component but by one of a specific interpreter from among the plurality of interpreters.

9. The image forming apparatus according to claim 8, wherein the any one interpreter requires the control component to specify a page subject to generation of intermediate data before the interpretation for the invalid page, and stops the requiring after the interpretation for the invalid page.

10. The image forming apparatus according to claim 9, wherein the control component stops the specifying after the interpretation for the invalid page.

11. The image forming apparatus according to claim 8,
wherein the one interpreter notifies the control component that the intermediate data of the page subsequent to this invalid page is generated, together with a number of this page.

12. The image forming apparatus according to claim 8,
wherein the control component controls whether to process the generated intermediate data of one or more pages according to the page number that the control component is notified of from the interpreter, and
wherein the one interpreter that generates the intermediate data of the page subsequent to the invalid page determines the page number that the one interpreter notifies the control component of according to a number of interpreted invalid page(s).

13. The image forming apparatus according to claim 8, wherein the print data is written in a predetermined page description language.

* * * * *